United States Patent [19]

Binzen

[11] Patent Number: 5,154,271

[45] Date of Patent: Oct. 13, 1992

[54] TELESCOPIC CHUTE

[75] Inventor: Willard Binzen, Saratoga Springs, N.Y.

[73] Assignee: Svedala Industries, Incorporated, Pittsburgh, Pa.

[21] Appl. No.: 728,109

[22] Filed: Jul. 10, 1991

[51] Int. Cl.⁵ .............................................. B65G 11/14
[52] U.S. Cl. ...................................... 193/30; 193/25 C
[58] Field of Search ......................... 193/6, 15, 25 C, 30

[56] References Cited

U.S. PATENT DOCUMENTS

| 370,142 | 9/1887 | Holcomb | 193/30 X |
|---|---|---|---|
| 1,230,820 | 6/1917 | Levalley et al. | 193/27 |
| 2,906,384 | 9/1959 | Beebe | 193/30 |
| 3,926,290 | 12/1975 | Isojima et al. | 193/27 |
| 3,958,700 | 5/1976 | Foy et al. | 193/30 X |
| 4,061,221 | 12/1977 | Higashinaka et al. | 193/30 X |
| 4,161,243 | 7/1979 | Grisnich | 193/27 |
| 4,225,033 | 9/1980 | Fukagai et al. | 193/30 X |
| 4,492,294 | 1/1985 | Ball | 193/25 C |

FOREIGN PATENT DOCUMENTS

| 0051170 | 4/1979 | Japan | 193/30 |
|---|---|---|---|
| 0011477 | 1/1980 | Japan | 193/30 |
| 0170302 | 10/1982 | Japan | 193/30 |

Primary Examiner—Robert P. Olszewski
Assistant Examiner—James R. Bidwell
Attorney, Agent, or Firm—Webb Burden Ziesenheim & Webb

[57] ABSTRACT

An extensible and retractable telescopic chute for delivery of bulk materials includes a plurality of nestable chute segments, namely, an uppermost segment adapted to be attached to the discharge end of a bulk material handling machine, a lowermost chute segment and a plurality of intermediate chute segments therebetween. A yoke member surrounds the lowermost chute segment and is attached thereto. A pair of sheave support posts upwardly extend on opposed sides of the yoke member. Each of the posts carry a rotatable sheave wheel which are respectively adapted to operably engage a wire rope of the hoist mechanism of the material handling machine. The yoke member bears the loading weight of the nested chute segments as the telescopic chute is retracted so as to avoid sidewall deformation of the lowermost segment. The vertically extending sheave support posts locate the sheave wheels well above a center of gravity of the nested chute segments to stabilize the chute assembly above a vertical axis.

11 Claims, 3 Drawing Sheets

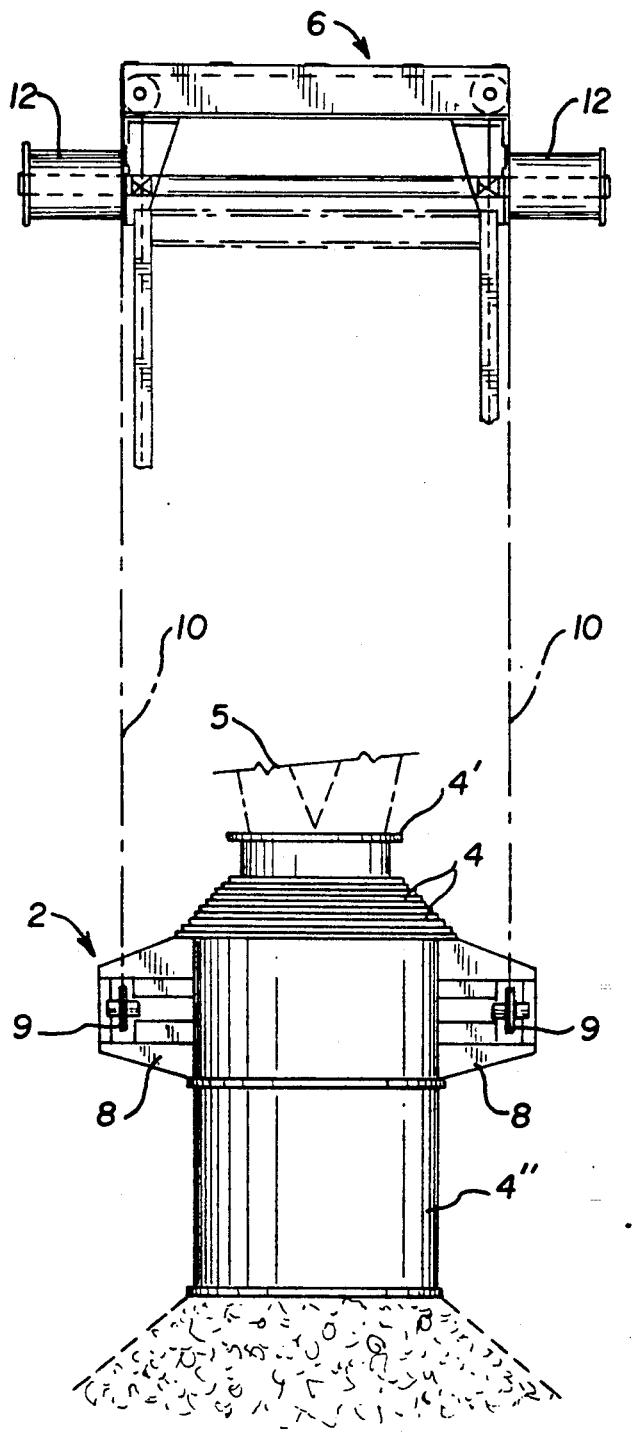
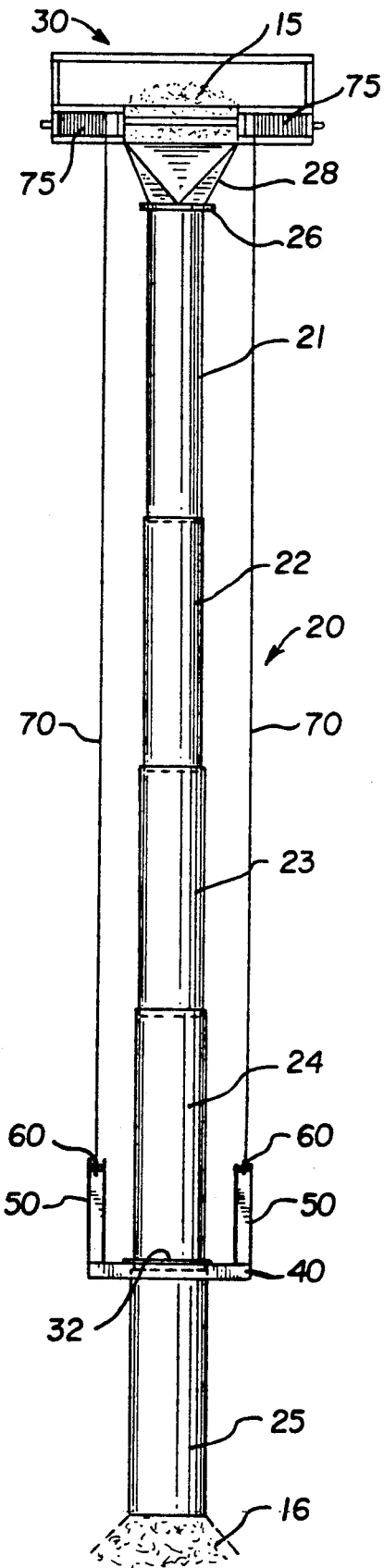
FIG. 1  PRIOR ART
FIG. 2

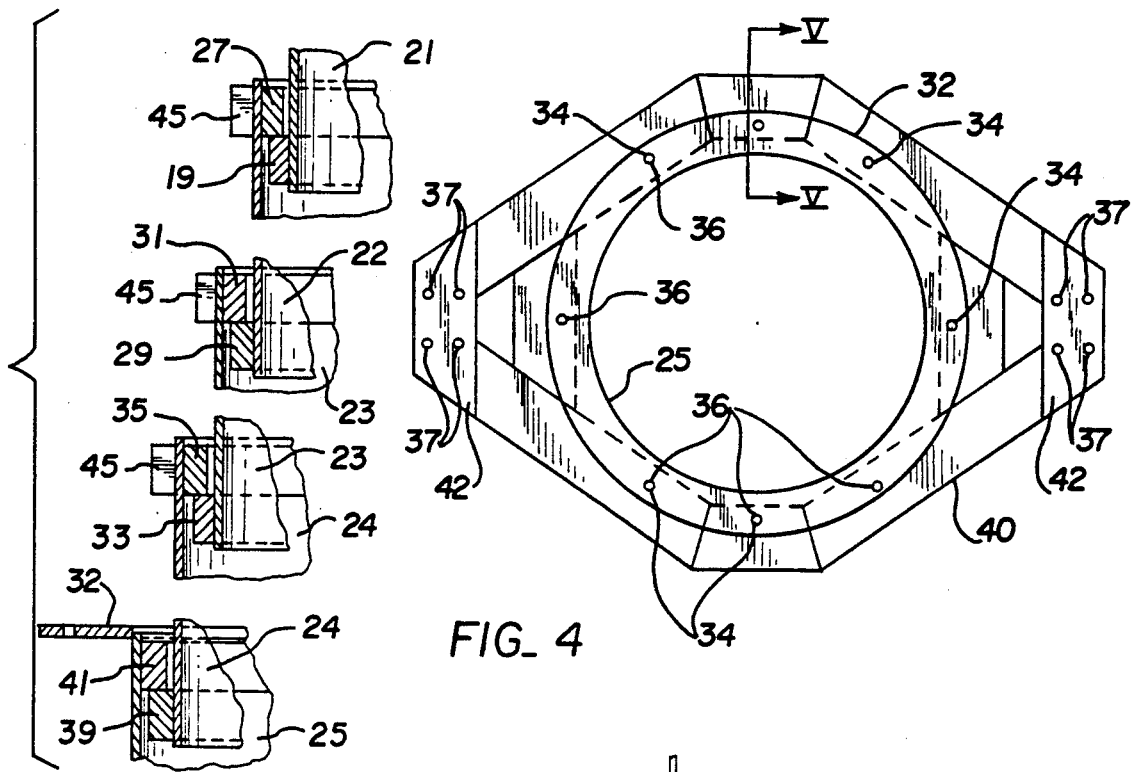
FIG. 3
FIG. 4
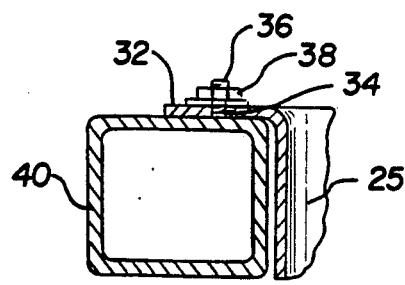
FIG. 5
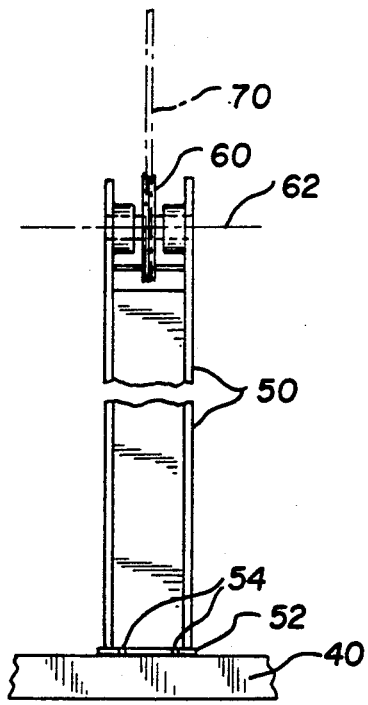
FIG. 6

TELESCOPIC CHUTE

BACKGROUND OF THE INVENTION

The present invention relates generally to bulk material handling apparatus and more particularly to a vertically adjustable, telescopic chute for delivery of granular, bulk material such as coal or the like to a delivery site. The use of telescopic chutes for the loading or delivery of granular materials is well-known and advantageous since they are capable of handling high tonnage throughputs while minimizing, to a degree, airborne dust generation. Use of a telescopic chute in delivering sized, granular coal to the storage yard of a power plant, for example, is common, wherein the chute is telescopically extended a vertical distance of over eighty feet from the delivery end of a conveyor device. As the height of the coal pile increases, the telescoping segments of the chute are incrementally raised and sequentially nested to maintain the delivery end of the lowermost chute segment in a spaced relation to the pile. In this manner, the lower end of the chute is not buried in the rising pile, and the shape of the pile may be controlled.

Heretofore, certain structural characteristics have caused difficulties in the operation of telescopic chutes. In prior chutes of this type, the wire ropes or cables used for hoisting are attached to the sidewall of the lowermost chute segment by outwardly extending, laterally mounted pulley arms. As the chute segments are raised, the lowermost segment with the pulley arms bears the total weight of the nested segments. This loading on the laterally extending arms causes the cross-sectional shape of the lowermost segment to become oval-like which naturally results in a binding condition in the upper chute segments which are to be nested as the chute is raised. The location of the pulleys or sheave wheels along the sides of the lowermost segment also results in the center of gravity of the nested segments being near the rotational centerline of the sheave wheels as the segments are being nested thereabove. This center of gravity problem causes instability of prior telescopic chutes due to the fact that the nested segments tend to become easily misaligned axially as the chute is raised, thus making nesting more difficult.

The present invention solves the problems found in prior chute devices by providing a telescopic chute in which the cross-sectional shape of the lowermost segment remains circular during raising operations to thereby eliminate the prior binding problems. In addition, the telescopic chute of the present invention provides a lifting structure which transfers the bearing weight of the chute segments from the lowermost chute to a separate structural bracing member so as to greatly improve the operation of the chute while minimizing costly maintenance. Still further, the telescopic chute of the invention provides an improved sheave wheel support structure which stabilizes the center of gravity of the nested chute segments relative to the hoist ropes to improve axial nesting alignment of adjacent segments as the chute is being raised.

While telescopic chutes limit dust generation compared with totally unenclosed conveyor dumping, such chutes still produce a significant amount of dust during operation, particularly where the granular material is free falling from heights greater than fifty feet or more. The present invention further provides a telescopic chute including a novel dust collection system to further reduce the escape of airborne particulates.

SUMMARY OF THE INVENTION

Briefly stated, the telescopic chute of the present invention comprises a plurality of chute segments each successively increasing in diameter from a first or uppermost segment to a last or lowermost segment to permit the successive nesting of a superjacent segment within a subjacent segment as the chute is raised. The invention further includes a yoke structure which surrounds the lowermost chute segment and is preferably secured to a peripheral flange carried by an upper end of the lowermost segment. The yoke includes two outwardly extending pads on laterally opposed sides of the lowermost chute segment. A pair of upwardly extending sheave support posts are secured to the lateral pads of the yoke. The posts each carry a grooved pulley or sheave wheel at an upper end thereof to rotatably receive a lifting wire rope or cable. The uppermost chute segment is adapted to be secured to a feed hopper which is mounted on the end of a conveyor of a material handling machine. A pair of motor driven hoist winches are mounted adjacent to the hopper, around which the wire ropes from the sheave wheels are reeved. Rotation of the winches in one direction raises the yoke and the lowermost chute segment. Continued winch rotation causes continued upward movement of the lowermost segment and sequential nesting of adjacent chute segments. Rotation of the winches in a second direction permits the wire ropes to play off of the winches in order to sequentially lower the chute segments.

The outlet end of the lowermost segment also preferably carries a discharge housing thereon. A flexible conduit communicates with the interior of the discharge housing at one end and with a dust collector at the other end. An induced draft is imparted to the conduit to cause a flow of dust laden air to the collector. The discharge housing has a deflector surface which directs the flow of granular material across the expanse of the exit orifice to block the escape of dust laden air from the chute. The discharge housing may also include a drive motor and appropriate gearing and roller supports to permit rotation of the housing relative to the telescopic chute to provide improved control of the material stream for trimming of the pile.

BRIEF DESCRIPTION OF THE DRAWINGS

FIG. 1 is an enlarged side elevation view of a typical prior art telescopic chute in a retracted condition;

FIG. 2 is a side elevation view of a telescopic chute assembly of the present invention in an extended position;

FIG. 3 is an enlarged, fragmented, side sectional view of a plurality of chute segments taken from the assembly of FIG. 2 depicting the placement of the various stops for holding adjacent segments in the extended position;

FIG. 4 is an enlarged top plan view of the yoke member positioned on the flange of the lowermost chute segment of FIG. 2;

FIG. 5 is a partial fragmented, cross-sectional view of the yoke member and flange taken along line V—V of FIG. 4;

FIG. 6 is an enlarged side elevational view of one of the sheave support posts of FIG. 1;

DETAILED DESCRIPTION OF THE INVENTION

Figures 7, 8:
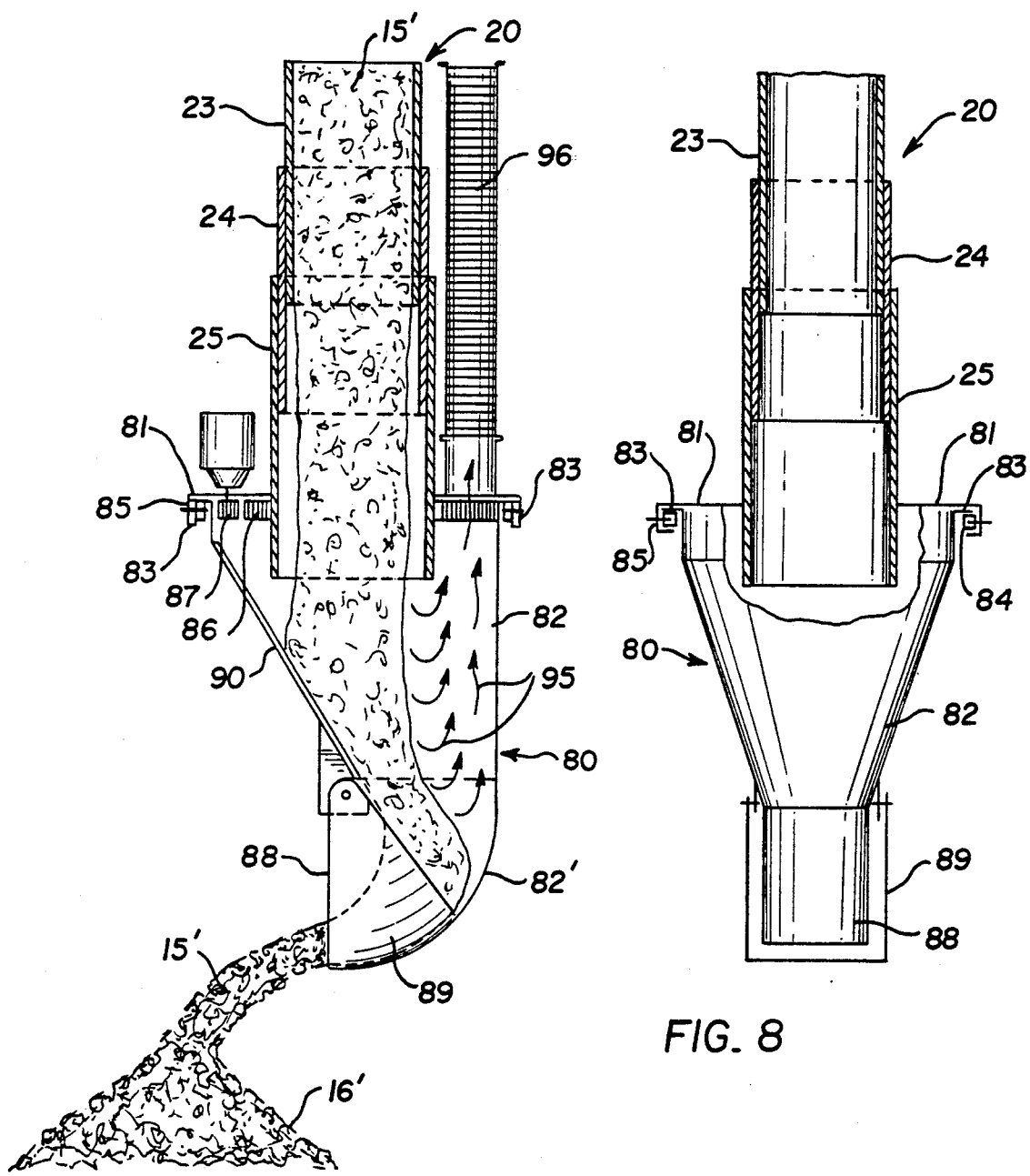
FIG. 7 is a cross-sectional side elevational view of a modified form of the invention having dust control means associated therewith.
FIG. 8 is a front view of the chute of FIG. 7.

In order to appreciate the advantages of the present invention, it is helpful to first understand the structure and operation of a typical telescopic chute of the prior art, designated generally by reference numeral 2 in FIG. 1. The prior art chute 2 includes a plurality of telescoping, cylindrically shaped chute segments 4, shown in the retracted or nested position. A typical prior art telescopic chute may contain ten such segments 4 which are individually about seven feet in length and thus capable of extending to an operable chute length on the order of about seventy feet. An uppermost chute segment 4' is attached to a feed hopper 5 at the discharge end of a conveyor carried by a conventional material handling machine 6. The lowermost chute segment 4" has a pair of outwardly extending sheave support arms 8 attached to the sidewall thereof. A grooved sheave wheel 9 is rotatably mounted on each arm 8 to receive a wire rope 10 therearound. A pair of motor driven winches 12 operably coil the wire ropes 10 to permit selective raising and lowering of the telescopic chute assembly 2. It will be observed that as successive chute segments 4 are nested within the lowermost segment 4", the loading exerted on the support arms 8 correspondingly increases. This loading tends to cause the lowermost segment 4" to assume an oval cross-sectional shape since the support arms 8 are attached to the sidewall of the chute segment. When such sidewall deformation occurs, binding begins to take place and prevents smooth and/or complete nesting of the upper chute segments. In addition, the stability of the prior art chute assembly 2 about the vertical centerline is somewhat deficient. This condition causes vertical cocking and axial misalignment between adjacent segments, which naturally makes smooth retraction of the chute 2 quite difficult. The vertical centerline instability problem is caused by the fact that the center of gravity of the nesting segments 4 gradually raises to a location near the sheave support arms 8 as successive segments are nested during retraction. When the center of gravity of the chute is near or above the level of the support arms 8, stability about the vertical centerline is minimal at best and the assembly 2 is susceptible to unwanted tilting movement caused by wind, turning sheaves, machine vibration and the like.

The telescopic chute of the present invention designated generally 20 in FIG. 2 overcomes the problems encountered in the prior art chute assembly 2, described above. More specifically, the prior problems of segment bowing and vertical centerline instability/misalignment are eliminated by the telescopic chute 20 of the invention.

The telescopic chute assembly 20 preferably is made up of only five chute segments which includes an uppermost or first chute segment 21, an intermediate or second chute segment 22, an intermediate or third chute segment 23, an intermediate or fourth chute segment 24 and a lowermost or fifth chute segment 25. The uppermost chute segment 21 carries a flange 26 which is attached by bolts (not shown) to a conveyor discharge or chute feed hopper 28 of a conventional material handling machine 30, the same as or similar to machine 6 of FIG. 1. The chute segments 21-25 of the present invention 20 are substantially longer than the segments 4 of the prior chute 2. For example, the first chute segment 21 is on the order of about twenty feet in length, while the intermediate segments 22-14 and lowermost segment 24 are each about 16 feet in length. This provides a total, extended length for chute 20 of about eighty four feet while utilizing a total of only five chute segments, one half the number previously employed.

While the chute segments 21-25 are shown in the drawings as being cylindrical in shape, it is, of course, understood that other shapes could be employed, such as a square or other regular polygonal cross-sectional shape, for example.

The lowermost or fifth chute segment 25 carries an outwardly extending flange 32 around the periphery of its upper edge and has a plurality of spaced holes 34 formed therethrough, see FIG. 4, 5. A yoke 40, constructed in box beam shape, surrounds the sidewall of the lowermost chute segment 25 and bears against the underside of the flange 32 thereof, see FIGS. 1, 4 and 5. The yoke 40 has a plurality of threaded studs 36 welded thereto in spaced locations aligned with the holes 34 carried by the flange 32, FIG. 5. A lock nut assembly 38 is threadably engaged at each stud 36 to secure the yoke 40 to the chute segment 25.

A pair of sheave support posts 50, FIGS. 1 and 6, vertically extend from mounting pads 42 located at opposed sides of the yoke 40. Support posts 50 have a base plate 52 which has four bolt holes 54 formed therethrough. Bolt holes 54 align with threaded studs 37 carried by the sides 42 of the yoke, FIG. 4, and are secured by suitable lock nuts (not shown). By way of example, the support posts are spaced apart a distance of about eight feet for a typically sized lowermost chute segment 25 having a diameter slightly in excess of four and one half feet.

The support posts 50 each carry a grooved sheave wheel 60 which is journaled for rotation at the upper end of each. The support posts 50 are at least about six feet in length as measured from the axis of rotation 62 of the sheave wheel 60 to the top surface of the yoke 40, the purpose of which will be explained more fully below. A braided wire rope 70 runs over each of the sheave wheels 60 for reeving about respective winches 75 at the upper, delivery end of the material handling machine 30.

With reference to FIG. 3, each of the adjacent pairs of chute segments are provided with conventional interfering stop bars to prevent the chute segments from completely disengaging from one another when the chute assembly is extended and retracted. The first chute segment 21 carries a stop bar 19 around the perimeter of its lower end which engages a like stop bar 27 carried around an upper, inner perimeter of the second chute segment 22. The second segment 22 also carries a stop bar 29 around the outer perimeter at its lower end which engages a stop bar 31 positioned around the inner perimeter at the upper end of the third chute segment 23 when the chute segments are extended. A stop bar 33 carried at the lower, outer perimeter of third segment 23 engages a stop bar 35 at the upper, inner perimeter of the fourth chute segment 24. Finally, the lower, outer perimeter of the fourth segment 24 has a stop bar 39 which engages a stop bar 41 positioned around the inner periphery at the upper end of the fifth chute segment 25 to prevent disengagement when the chute assembly 20 is extended.

A plurality of spaced-apart, conventional alignment and stop members 45 are affixed around the outer perimeters of chute segments 22, 23 and 24 at 30° spacings, for example, to provide equal spacing between adjacent segment sidewalls when the chute segments are being nested during retraction of the assembly 20. Alignment members 45 are preferably cube-shaped pieces of steel bar stock about 1 inch thick × ½ inch wide and 2 inches long. Twelve such members 45 are weldably secured around the periphery of each of the segments 22, 23 and 24 when the aforesaid 30° spacing is employed.

In use, it will be appreciated that the telescopic chute 20 will assume the fully extended position depicted in FIG. 2 when the wire ropes 70 are played off of the winches 75. Coal or other particulate material 15 is conveyed upwardly by an endless conveyor belt on the machine 30 for delivery to the feed hopper 28. The material 15 falls downwardly by gravity through the five segments 21–25 of the chute 20 for discharge onto a pile 16. As the height of the coal or like material forming the pile 16 increases, the motor driven winches 75 are rotated in a given direction to shorten the length of the wire ropes 70 and, thus raise the lowermost segment 25.

As the wire ropes 70 are wound on the winches 75, the wire ropes move around the rotating sheave wheels 60 which, in turn, pull the support posts 50 and yoke 40 upwardly. The upwardly moving yoke 40 bears against the underside of the flange 32 carried by the lowermost or fifth chute segment 25 causing the segment 25 to also move upwardly. Continued upward movement of the fifth chute segment 25 results in the nesting of intermediate segment 24 within segment 25. As seen in FIG. 3, when stop bar 41 of the lowermost chute segment 25 moves upwardly a sufficient distance, it will engage the stop member 45 carried by the next intermediate or fourth chute segment 24. At that point, the fourth and fifth chute segments 24 and 25 are fully nested and the nested pair continued to move upwardly as the wire ropes 70 are hoisted until the stop bar 35 of fourth chute segment 24 engages the stop member 45 carried by the third chute segment 23 which is then nested within the chute segment 24. Successive chute segments 22 and 21 are nested in a similar, sequential manner with stop member 31 carried by chute segment 23 engaging stop member 45 of segment 22 as the chute assembly 20 is retracted.

Since the flange 32 of the lowermost or fifth chute segment 25 bears against the lifting yoke 40, the entire combined weight of the nested chute segments 22–25 is transferred directly to and carried by the yoke 40. Thus, there are no sidewall loading forces acting on the lowermost chute segment 25 to cause bowing deformation as is the case in the prior art chute 2 of FIG. 1. It will therefore be appreciated that all lifting loads are uniformly carried by the flange 32 and the attached yoke 40 and are applied in a vertical loading direction so as to avoid the lateral or torsional sidewall loading of the prior art. Thus, there is no bowing of the lowermost chute segment 25 and the successive chute segments 24–21 nest sequentially without any of the binding problems previously encountered.

The center of gravity of the retracting chute assembly 20 also remains well below the rotational lifting axes 62 of the sheave wheels 60 by virtue of the fact that the sheave support posts 50 position the sheave wheel axes 62 about six feet above the yoke 40. As the chute segments 25, 24, 23, 22 and 21 are nested, the weight and center of gravity of the assembly 20 becomes concentrated in the area of the yoke 40. The length of the support posts 50 insures that the sheave wheel axes 62 constantly remain well above the nested center of gravity so as to insure stability about a vertical axis as the chute assembly is raised. This increased vertical stability provides freedom from cocking between adjacent segments so as to increase the efficiency of the device.

FIG. 7 and 8 show a dust control feature of the present invention which is suitable for use in combination with the telescoping chute 20. The lowermost chute segment 25 is fitted with a nozzle member generally designated 80 for containing the dust generated by the falling particulate material 15' and for controlling its delivery path so as to aid in trimming the pile 16'.

The nozzle member 80 includes a horizontal top plate 81 secured around the outer periphery of the lowermost chute segment 25 adjacent to the discharge end thereof. A rotatable housing 82 is suspended from the top plate 81. The housing 82 includes an outwardly turned flange 83 which is movably supported by a plurality of rollers 84 carried by a downwardly depending flange 85 of the top plate 81. A ring shaped gear rack 86 extends around the perimeter of the housing 82 which is engaged by a motor driven pinion gear 87 to selectively rotate the housing causing the material 15' to be discharged from housing discharge opening 88 in a particular direction. The housing 82 has a hinged spoon member 89 attached at the discharge opening 88 to permit the material stream 15' to be dispensed at a deflected angle relative to the vertical axis, as shown in FIG. 7.

In order to control the dust emissions, the nozzle member 80 has an angularly disposed, internal deflector plate 90 which traverses the free fall path of material 15' as it falls from the end of the segment 25. The falling material 15' strikes the plate 90 and deflects across the interior to the closed nose portion 82' and then reverses its path to exit at the discharge opening 88. This reverse flow pattern of material caused by the deflector plate 90 and nose 82' effectively closes off and blocks the opening 88 to prevent the discharge of airborne particulates 95. This trapping action is very effective in containing the particulate 95 to the enclosed space within the housing 82.

A flexible conduit 96 is attached to the top plate 81 and communicates with the interior of the housing 82. A remotely located fan (not shown) induces a draft within the conduit 96 to pull the airborne particulates 95 upwardly therein. A conventional dust collector device (not shown) which is a modular unit of known design and manufacture is remotely located atop the bulk conveyor machine 30 to capture the airborne particulates 95 in said collector device. Thus, the problems of dust generation and resultant air pollution commonly associated with telescopic chutes of this type is greatly reduced by the present invention.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

What is claimed is:

1. An improved telescopic chute of the type comprising a plurality of chute segments, including an uppermost chute segment adapted to be attached to a discharge end of a bulk material handling machine, a lowermost chute segment and at least one intermediate chute segment located between said uppermost and lowermost chute segments, said chute segments having progressively increasing diameters from said uppermost to said lowermost segments to permit nesting of a superjacent segment within a subjacent segment wherein the improvement comprises:

a yoke member surrounding said lowermost chute segment;

sheave means associated with the yoke member adapted to be attached to a hoist mechanism of the material handling machine wherein the sheave means includes a pair of sheave support posts, each support post vertically extending upwardly from opposed sides of said yoke member and each post carrying a rotatable sheave wheel at a distance spaced above said yoke member, each of said sheave wheels adapted to operably engage a wire rope of the lifting mechanism of said bulk handling machine; and attachment means for securing said yoke member to said lowermost chute segment whereby a bearing weight of the nested chute segments is carried by said yoke member.

2. The improved telescopic chute of claim 1 wherein the attachment means comprises flange means outwardly extending around at least a portion of an upper perimeter of said lowermost chute segment, said yoke member positioned beneath said flange means and secured to said flange means.

3. The improved telescopic chute of claim 1 which contains three intermediate chute segments.

4. The improved telescopic chute of claim 3 wherein each of said chute segments are between about 16 feet to 20 feet in length.

5. An improved telescopic chute of the type comprising a plurality of chute segments, including an uppermost chute segment adapted to be attached to a discharge end of a bulk material handling machine, a lowermost chute segment and at least one intermediate chute segment located between said uppermost and lowermost chute segments, said chute segments having progressively increasing diameters from said uppermost to said lowermost segments to permit nesting of a superjacent segment within a subjacent segment wherein the improvement comprises:

a yoke member surrounding said lowermost chute segment;

sheave means associated with the yoke member adapted to be attached to a hoist mechanism of the material handling machine;

attachment means for securing said yoke member to said lowermost chute segment whereby a bearing weight of the nested chute segments is carried by said yoke member; and wherein the lowermost chute segment includes a flange outwardly extending around an upper periphery thereof and positioned on an upper surface of said yoke member to transfer a bearing weight of said nested segments to said yoke member; said yoke member including a pair of sheave support posts upwardly extending on opposed sides of said yoke member, each of said support posts carrying a rotatable sheave wheel thereon adapted to operably engage a wire rope of the hoist mechanism of said material handling machine, said sheave wheels spaced a distance above the yoke member whereby a center of gravity of a nested plurality of chute segments is spaced below the sheave wheels.

6. The telescopic chute of claim 5 wherein the sheave wheels are spaced above the yoke member a distance of at least about six feet.

7. An improved telescopic chute of the type comprising a plurality of chute segments, including an uppermost chute segment adapted to be attached to a discharge end of a bulk material handling machine, a lowermost chute segment and at least one intermediate chute segment located between said uppermost and lowermost chute segments, said chute segments each having progressively increasing diameters from said uppermost to said lowermost segments to permit nesting of a superjacent segment within a subjacent segment wherein the improvement comprises:

said lowermost chute segment having a peripheral flange outwardly extending at an upper end thereof;

a yoke member surrounding said lowermost chute segment and attached to the peripheral flange thereof; and a pair of sheave support posts upwardly extending on opposed sides of said yoke member, each of said support posts carrying a rotatable sheave wheel thereon at a distance spaced above the yoke member, said sheave wheels adapted to operably engage a wire rope carried by a hoist mechanism on said material handling machine.

8. The improved telescopic chute of claim 7 wherein the sheave wheels are spaced above said yoke member a sufficient distance whereby a center of gravity of a nested plurality of chute segments is spaced below the sheave wheels.

9. The improved telescopic chute of claim 8 wherein the sheave wheels are spaced above the yoke member at least about six feet.

10. The improved telescopic chute of claim 7 which comprises an uppermost chute segment, three intermediate chute segments and a lowermost chute segment.

11. The improved telescopic chute of claim 7 wherein the chute segments have a cylindrical shape.

* * * * *

UNITED STATES PATENT AND TRADEMARK OFFICE
CERTIFICATE OF CORRECTION

PATENT NO. : 5,154,271
DATED : October 13, 1992
INVENTOR(S) : Willard Binzen It is certified that error appears in the above-identified patent and that said Letters Patent is hereby corrected as shown below:

Column 4 Lines 5-6 "22-14 and lowermost segment 24"
  should read --22-24 and lowermost segment 25--.

Column 4 Line 18 "FIG." should read --FIGS.--.

Column 6 Line 9 "FIG." should read --FIGS.--.

Signed and Sealed this

Twenty-first Day of September, 1993

*Attest:*

BRUCE LEHMAN

*Attesting Officer*    *Commissioner of Patents and Trademarks*